(12) United States Patent
Abbott

(10) Patent No.: US 8,428,445 B2
(45) Date of Patent: Apr. 23, 2013

(54) GAS HEATING APPARATUS AND METHODS

(75) Inventor: Richard C. Abbott, New Boston, NH (US)

(73) Assignee: Thermoceramix, Inc., Boucherville (CA)

( * ) Notice: Subject to any disclaimer, the term of this patent is extended or adjusted under 35 U.S.C. 154(b) by 797 days.

(21) Appl. No.: 12/070,713

(22) Filed: Feb. 20, 2008

(65) Prior Publication Data

US 2008/0217324 A1    Sep. 11, 2008

Related U.S. Application Data

(60) Provisional application No. 60/902,291, filed on Feb. 20, 2007, provisional application No. 60/993,262, filed on Sep. 11, 2007.

(51) Int. Cl.
F24H 3/02 (2006.01)

(52) U.S. Cl.
USPC ............ 392/360; 392/347; 392/350; 219/543

(58) Field of Classification Search .................. None
See application file for complete search history.

(56) References Cited

U.S. PATENT DOCUMENTS

| | | | |
|---|---|---|---|
| 1,490,088 A | 4/1924 | Bridges | |
| 2,119,680 A | 6/1938 | Long | |
| 3,174,211 A * | 3/1965 | Gaszak | 29/611 |
| 3,277,419 A | 10/1966 | Butz | |
| 3,767,895 A | 10/1973 | Needham | |
| 3,995,143 A | 11/1976 | Hervert | |
| 4,122,329 A | 10/1978 | Godel | |
| 4,310,745 A | 1/1982 | Bender | |
| 4,469,936 A | 9/1984 | Hunter | |
| 4,757,183 A | 7/1988 | Karey et al. | |
| 4,763,425 A * | 8/1988 | Grennan | 34/552 |
| 4,889,974 A | 12/1989 | Auding et al. | |
| 5,004,893 A | 4/1991 | Westover | |
| 5,039,840 A | 8/1991 | Boardman | |
| 5,107,603 A * | 4/1992 | Durazzani | 34/91 |
| 5,504,307 A | 4/1996 | Hayashi et al. | |
| 5,616,266 A | 4/1997 | Cooper | |
| 5,714,738 A | 2/1998 | Hauschulz et al. | |
| 5,889,261 A | 3/1999 | Boardman | |
| 5,935,470 A | 8/1999 | Deo et al. | |
| 6,376,816 B2 | 4/2002 | Cooper et al. | |
| 6,555,257 B1 | 4/2003 | Nishioka et al. | |
| 6,592,075 B2 | 7/2003 | Wilson et al. | |
| 6,762,396 B2 | 7/2004 | Abbott et al. | |
| 6,873,790 B1 | 3/2005 | Cooper et al. | |

(Continued)

FOREIGN PATENT DOCUMENTS

| | | |
|---|---|---|
| GB | 2 021 257 | 11/1979 |
| JP | 58 141868 | 8/1983 |

(Continued)

*Primary Examiner* — Thor Campbell
(74) *Attorney, Agent, or Firm* — BCF LLP

(57) ABSTRACT

A thermally sprayed gas heater comprises a gas flow apparatus that propels a gas through a housing; and a thermally sprayed heater bonded to a surface of the apparatus, the heater positioned to heat the gas flow in the housing. In other aspects, a heater system for a turbulent flow gas duct comprises a duct having a gas flow channel, the channel having a shaped surface providing turbulent gas flow in the channel, and a thermally sprayed heater positioned to heat the gas flow in the channel.

20 Claims, 10 Drawing Sheets

U.S. PATENT DOCUMENTS

| | | | |
|---|---|---|---|
| 6,917,753 B2 | 7/2005 | Cooper | |
| 6,918,194 B2 | 7/2005 | Freese et al. | |
| 6,919,543 B2 | 7/2005 | Abbott et al. | |
| 6,963,054 B2 | 11/2005 | Couraud | |
| 7,109,448 B2 | 9/2006 | Goranson | |
| 7,149,416 B2 | 12/2006 | Nawrot et al. | |
| 7,158,718 B2 | 1/2007 | Russegger | |
| 2002/0096512 A1 | 7/2002 | Abbott et al. | |
| 2003/0116559 A1 | 6/2003 | Park | |
| 2003/0121906 A1 | 7/2003 | Abbott et al. | |
| 2004/0045187 A1 * | 3/2004 | Curry et al. | 34/595 |
| 2004/0149733 A1 | 8/2004 | Abbott et al. | |
| 2004/0188418 A1 | 9/2004 | Aisenbrey | |
| 2005/0084253 A1 | 4/2005 | Cooper et al. | |

FOREIGN PATENT DOCUMENTS

| | | |
|---|---|---|
| JP | 11-196927 | 7/1999 |
| JP | 2001 227747 | 8/2001 |
| SU | 1560-942 | 5/2008 |
| WO | WO 98/51127 | 11/1998 |
| WO | WO 99/49700 | 9/1999 |
| WO | WO 00/70915 | 11/2000 |
| WO | WO 2004/049761 | 6/2004 |

* cited by examiner

GAS HEATING APPARATUS AND METHODS

CROSS REFERENCE TO RELATED APPLICATIONS

This application claims the benefit of U.S. Provisional Application No. 60/902,291, filed Feb. 20, 2007 and entitled GAS HEATING APPARATUS and also claims the benefit of U.S. Provisional Application No. 60/993,262, filed Sep. 11, 2007 and entitled THERMAL RESISTIVE HEATER. The entire teachings of the above applications are incorporated herein by reference.

BACKGROUND OF THE INVENTION

Various devices are known for heating a gas, such as air, and gas heating devices have been employed for numerous industrial and domestic applications, such as cooking and room heating, and in many appliances such as hair dryers and clothes dryers. In an electrical gas heater, an electric heating element is energized and gas is caused to flow past the element. The air may flow past the element either naturally or by being forced by a blower or fan.

The most common electric heating element used today is a resistance heating wire, such as a nickel chromium wire, that is wound into a heating coil. These wire-type heating elements are effective at generating heat, but frequently need to operate at very high temperatures in order to provide sufficient heat to the surrounding gas. The flux of radiant heat of the heating element is proportional to the fourth power of its temperature, thus when the heating element is operated at high temperatures (e.g., when it becomes red hot), the element transfers heat predominantly by radiation. Gasses do not absorb radiative heat well, so much of this radiant energy does not heat the gas flowing past the element, but instead radiates to and heats up the surrounding structures. The conventional wire-based electric heating elements are therefore not very efficient in heating gas, due to this radiant heat loss. Furthermore, the intense radiant heat generated by the wire heating element can heat up surrounding structures to dangerous temperatures, which can pose a safety risk. For example, in the case of a clothes dryer, the radiant heat from the heating element can heat components of the dryer that are accessible to users, which can result in burns.

SUMMARY OF THE INVENTION

A thermally sprayed gas heater comprises a gas flow apparatus that propels a gas through a housing; and a thermally sprayed heater bonded to a surface of the apparatus, the heater positioned to heat the gas flow in the housing.

A thermal spray coating process can be used to deposit coatings that behave as heaters when electrically energized. In a preferred method for fabricating a heating element using thermal spray, a material in powder or wire form is melted and formed into a flux of droplets that are accelerated by means of a carrier gas towards the surface to be coated. The droplets impact the surface at high speed, sometimes supersonic speed, and very quickly solidify into flat platelets. By traversing the spray apparatus over the surface, a substantially lamellar coating comprising these solidified platelets is formed.

In certain aspects, the bulk resistivity and thus the heat generating capability of the heater element can be raised by providing resistive heating layer composed of an electrically conductive material and an electrically insulating material, where the electrically insulating material has a higher electrical resistance than the electrically conductive material. In certain embodiments, the material resistivity of the thermally sprayed heating layer is greater than about $10^{-4}$ $\Omega$-cm.

According to another aspect, a heater system for a turbulent flow gas duct comprises a duct having a gas flow channel, the channel having a shaped surface providing turbulent gas flow in the channel, and a thermally sprayed heater positioned to heat the gas flow in the channel.

The thermally sprayed gas heaters of the invention possess a number of advantages compared to conventional heaters with wire heating elements. In the present invention, the heater coating is disposed over a surface of the gas heater where the gas has substantial opportunity to pick up heat generated by the heater coating. In preferred embodiments, the gas heater is configured to maximize the heat flux, Q, in the heat transfer equation, $$Q = hA(T_1 - T_0)$$

because A, the area of heat transfer, is generally much larger than in conventional gas heaters, and the heat transfer coefficient, h, is typically greater because the gas velocities are higher and boundary layers are smaller.

In certain embodiments, the present gas heaters distribute their power over a much larger area than a conventional heater with a wire heating element, thus the present heaters typically run cooler than wire heaters operating at the same power. Furthermore, the heater coatings of the invention can be bonded to the surface they cover, so that their power is transmitted to the heat transfer surface with less impedance to heat flow. The heater coatings of the invention can also be made very thin—typically 0.030 inches or less—resulting in a very compact gas heating apparatus, particularly in relation to bulky wire-wound heaters. The present apparatus can also be less expensive to manufacture than wire heaters because wire heaters often have complicated assembly issues and/or require expensive specialized assembly machinery.

Additionally, the gas heaters of the present invention can transfer their energy to the gas predominantly by forced convection, and by radiation to a much lesser extent, in contrast to wire heaters that frequently transmit more heat by radiation than by convection, and are therefore much less efficient.

In preferred embodiments, the gas heater is designed to promote turbulent flow of a gas, particularly at and around the heat transfer surface(s) of the heater. In fluid dynamics, turbulence or turbulent flow is a flow regime characterized by chaotic, stochastic property changes. This includes low momentum diffusion, high momentum convection, and rapid variation of pressure and velocity in space and time. Flow that is not turbulent is called laminar flow. The Reynolds number is commonly used to characterize whether flow conditions lead to laminar or turbulent flow. Laminar flow occurs at low Reynolds numbers, where viscous forces are dominant, and is characterized by smooth, constant fluid motion, while turbulent flow occurs at high Reynolds numbers and is dominated by inertial forces, which tend to produce random eddies, vortices and other flow fluctuations. The Reynolds number is a dimensionless parameter that depends on the mean velocity of the fluid, the flow geometry (characteristic length), and the kinematic fluid viscosity. The transition between laminar and turbulent flow is often indicated by a critical Reynolds number ($Re_{crit}$), which depends on the exact flow configuration and must be determined experimentally. Within a certain range around this point there is a region of gradual transition where the flow is neither fully laminar nor fully turbulent. For example, within circular pipes the critical Reynolds number is generally accepted to be about 2300, where the Reynolds number is based on the pipe diameter and the mean velocity $v_s$ within the pipe, but Reynolds numbers between about 2000 to 3000 characterize a transitional range where the flow can be partially laminar and partially turbulent.

According to another aspect, a method of forming a mica material for a heater assembly comprises mixing a mica material with an electrically insulating material to form a substrate for a heater assembly, the substrate having a thermal coefficient of expansion that is higher than pure mica.

In further embodiments, a heater for a cooking appliance having a gas flow system comprises a cooking device having a gas flow device that provides a gas flow to a cavity to cook a material positioned in the cavity. A thermally sprayed heater heats the gas flow delivered to the cavity.

According to yet another aspect of the invention, a method for thermally spraying a heater onto a substrate comprises providing a metallic material having a core and an insulator within the core, and thermally spraying the metallic material and the insulator onto a substrate to form a heater. The metallic material and the insulator can be thermally sprayed in the presence of a reaction gas that reacts with the metallic material to produce an insulating reaction product. This can further boost the resistivity of the thermally sprayed heater layer.

In various other aspects, the present invention is directed to drying appliances, baseboard heaters, and methods of fabricating various appliances and devices for heating a gas using a thermally sprayed heater.

DETAILED DESCRIPTION OF THE INVENTION

Resistive heating elements can be formed by a thermal spray process. Thermal spray is a versatile technology for depositing coatings of various materials, including metals and ceramics. It includes systems that use powder as feedstock (e.g., arc plasma, flame spray, and high velocity oxy-fuel (HVOF) systems), systems that use wire as feedstock (e.g., arc wire, HVOF wire, and flame spray systems), and systems using combinations of the same.

Arc plasma spraying is a method for depositing materials on various substrates. A DC electric arc creates an ionized gas (a plasma) that is used to spray molten powdered materials in a manner similar to spraying paint.

Arc wire spray systems function by melting the tips of two wires (e.g., zinc, copper, aluminum, or other metal) and transporting the resulting molten droplets by means of a carrier gas (e.g., compressed air) to the surface to be coated. The wire feedstock is melted by an electric arc generated by a potential difference between the two wires.

In flame spray, a wire or powder feedstock is melted by means of a combustion flame, usually effected through ignition of gas mixtures of oxygen and another gas (e.g., acetylene).

HVOF uses combustion gases (e.g., propane and oxygen) that are ignited in a small chamber. The high combustion temperatures in the chamber cause a concurrent rise in gas pressure that, in turn, generates a very high speed effluent of gas from an orifice in the chamber. This hot, high speed gas is used to both melt a feedstock (e.g., wire, powder, or combination thereof) and transport the molten droplets to the surface of a substrate at speeds in the range of 330-1000 m/sec. Compressed gas (e.g., compressed air) is used to further accelerate the droplets and cool the HVOF apparatus.

Other systems, typically used for materials having a relatively low melting point, impart very high velocities to powder particles such that the particles are melted by conversion of kinetic energy as they impact the substrate.

A thermal sprayed coating has a unique microstructure. During the deposition process, each particle enters a gas stream, melts, and cools to the solid form independent of the other particles. When particles impact the surface being coated, they impact ("splat") as flattened circular platelets and solidify at high cooling rates. The coating is build up on the substrate by traversing the spray apparatus (gun) repeatedly over the substrate, building up layer by layer until the desired thickness of coating has been achieved. Because the particles solidify as splats, the resultant microstructure is substantially lamellar, with the grains approximating circular platelets randomly stacked above the plane of the substrate.

Figure 1:
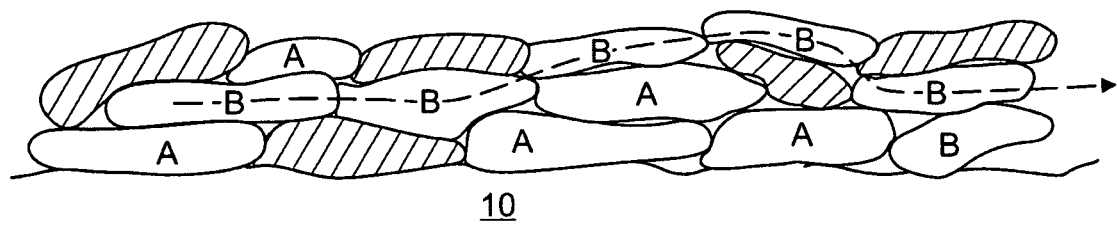
FIG. 1 is an illustration of the microstructure of a thermally-sprayed heater layer in accordance with the invention.

If the starting materials for forming the resistive heating layer consists of a blend of two or more different materials, the sprayed coating microstructure can be a lamellar array of two or more kinds of grains. As shown in FIG. 1, the two different materials can be viewed as forming two interpenetrating, interconnected lattices with the degree of interconnection being a function of the proportion of material that is present. In particular, if one material happens to be electrically insulating, and one electrically conducting, then the conductivity (or resistivity) will depend on the degree of interconnectedness of the conducting material. In FIG. 1, the deposited microstructure includes three discrete phases of different materials deposited on a substrate 100. Materials A and B are insulator and conductor, respectively. The cross-hatched phase represents additional material(s) that can be optionally added for engineering purposes, such as adhesion, thermal expansion, thermal conductivity, and emissivity. The dashed line indicates the electrical current path through the lattice.

For a deposited coating to use a desired power level to generate a particular amount of heat when a voltage is applied, the coating generally must have a particular resistance that is determined by the desired power level. The resistance, R, is calculated from the applied voltage, V, and the desired power level, P, as follows:

$$R=V^2/P$$

The resistance of the coating is a function of the geometry of the coating. Specifically, the resistance of the coating can be measured in terms of the electric current path length (L) the cross sectional area (A) through which the current passes, and the material resistivity ($\rho$) by the following equation:

$$R=\rho \cdot L/A$$

Therefore, to design a coating for a given power level and a given geometry that will operate at a given voltage, one has only to determine the resistivity of the material using the following equation:

$$\rho=R\cdot A/L=V^2\cdot A/(P\cdot L)$$

A composition having the necessary resistivity, $\rho$, can be obtained, for example, by using varying blends of conductors and insulators in the feedstock until a coating having the necessary resistivity is found empirically. According to another technique, as described in further detail below, the resistivity can be controlled, at least in part, by controlling an amount of a chemical reaction that occurs between the feedstock (such as a metal) and a gas that reacts with the feedstock (such as an ambient gas) during the deposition process.

That the resistivity is a controlled variable is significant because it represents an additional degree of freedom for the heater designer. In most situations, the resistivity of the heater material, e.g., nickel-chromium, is a fixed value. In such an instance, the heater designer must arrange the heater geometry (L and A) to obtain the desired power. For example, if it is desired to heat a tube by winding nickel-chromium wire around it, the designer must choose the correct diameter wire for A, the cross sectional area through which the electric current must pass, and the spacing of the windings for L, the total path length of the electric current.

Thermally-sprayed coatings that behave as electrical heaters can be composed of any electrically conducting material, but it is generally advantageous to chose materials that possess high electrical resistivity. This allows generation of power with high voltages and lower currents, preferably commonly used voltages such as 120 V or 240 V. It can be even more advantageous to boost the resistivity of heater coatings greater than the typical value of common materials, e.g. nickel-chromium, by adding insulating components, such as metal oxides, to the thermally-sprayed coating layer. This has the effect of allowing the design of heater coatings with compact dimensions, in particular shorter current paths, and making them eminently practical for use in a variety of applications.

According to one aspect of the invention, a heater coating deposited by thermal spray comprises an electrically conductive material and an electrically insulating material, the electrically insulating material having a higher electrical resistance than the electrically conductive material, such that the bulk resistivity ($\rho$) of the heater coating is raised relative to the electrically conductive material. In certain embodiments, the bulk resistivity is raised by a factor of approximately $10^1$ or more. In other embodiments, the bulk resistivity is raised by a factor of about $10^1$ to about $10^3$ above the resitivity of the electrically conductive material. According to certain embodiments, the content of the insulating material(s) in the heater coating comprises at least about 40% by volume, and in a preferred embodiment, between about 40-80% by volume.

Examples of materials that can be used to form an electrically conductive component in a thermally-sprayed heater coating include, without limitation, carbides such as silicon carbide or boron carbide, borides, silicides such as molybdenum disilicide or tungsten disilicide, and oxides such as lanthanum chromate or tin oxide which have electroconducting properties that are appropriate for the technology. For the insulating material, oxides are very good in the application, particularly $Al_2O_3$, which is refractory, insulating, and inexpensive. Aluminum nitride and mullite are also suitable as insulating materials.

Metallic component feedstocks can also be used to form the electrically conductive component of the heater coating, and in particular metallic components that are capable of forming an oxide, carbide, nitride and/or boride by reaction with a gas. Exemplary metallic components include, without limitation, transition metals such as titanium (Ti), vanadium (V), cobalt (Co), nickel (Ni), and transition metal alloys; highly reactive metals such as magnesium (Mg), zirconium (Zr), hafnium (Hf), and aluminum (Al); refractory metals such as tungsten (W), molybdenum (Mo), and tantalum (Ta); metal composites such as aluminum/aluminum oxide and cobalt/tungsten carbide; and metalloids such as silicon (Si). These metallic components typically have a resistivity in the range of $1-100\times10^{-8}$ $\Omega\cdot m$. During the coating process (e.g., thermal spraying), a feedstock (e.g., powder, wire, or solid bar) of the metallic component is melted to produce droplets and exposed to a reaction gas containing oxygen, nitrogen, carbon, and/or boron. This exposure allows the molten metallic component to react with the gas to produce an oxide, nitride, carbide, or boride derivative, or combination thereof, over at least a portion of the droplet.

The nature of the reacted metallic component is dependent on the amount and nature of the gas used in the deposition. For example, use of pure oxygen results in an oxide of the metallic component. In addition, a mixture of oxygen, nitrogen, and carbon dioxide results in a mixture of oxide, nitride, and carbide. The exact proportion of each depends on intrinsic properties of the metallic component and on the proportion of oxygen, nitrogen, and carbon in the gas. The resistivity of the layers produced by the methods herein range from $500-50,000\times10^{-8}$ $\Omega\cdot m$.

Exemplary species of oxide include $TiO_2$, $TiO$, $ZrO_2$, $V_2O_5$, $V_2O_3$, $V_2O_4$, $CoO$, $Co_2O_3$, $CoO_2$, $Co_3O_4$, $NiO$, $MgO$, $HfO_2$, $Al_2O_3$, $WO_3$, $WO_2$, $MoO_3$, $MoO_2$, $Ta_2O_5$, $TaO_2$, and $SiO_2$. Examples of nitrides include TiN, VN, $Ni_3N$, $Mg_3N_2$, ZrN, AlN, and $Si_3N_4$. Exemplary carbides include TiC, VC, $MgC_2$, $Mg_2C_3$, HfC, $Al_4C_3$, WC, $Mo_2C$, TaC, and SiC. Exemplary borides include TiB, $TiB_2$, $VB_2$, $Ni_2B$, $Ni_3B$, $AlB_2$, TaB, $TaB_2$, SiB, and $ZrB_2$. Other oxides, nitrides, carbides, and borides are known by those skilled in the art.

In order to obtain oxides, nitrides, carbides, or borides of a metallic component, the gas that is reacted with the component must contain oxygen, nitrogen, carbon and/or boron. Exemplary gases include, for example, oxygen, nitrogen, carbon dioxide, boron trichloride, ammonia, methane, and diborane.

During the thermal spray process, when the molten droplets of the metallic feed react with ambient gas present in the flux stream, the composition of the coating differs from that of the feedstock. The droplets can obtain, for example, a surface coating of the reaction product (e.g., an oxide, nitride, carbide, and/or boride derivative of the metallic component). Some droplets can react completely, while others can retain a large fraction of free metal, or can remain un-reacted. The resulting microstructure of the coating is a lamellar structure, which can consist of individual particles of complex composition. The coating has a reduced volume fraction of free metal with the remainder consisting of reaction products. When the gases that are added to the flux stream are chosen to form reaction products having a higher electrical resistivity than the starting metallic material, then the resulting coating exhibits a bulk resistivity that is higher than the free metallic component. The concentration of reaction product, and thus the resistivity of the coating layer, can be controlled, at least in part, by controlling the concentration of the reaction gas.

In certain embodiments, the resistivity of the heater coating can be further enhanced by selecting a feed stock for a thermal spray process that includes at least one electrically conductive component and at least one electrically insulating component, and where at least one component of the feed stock comprises a metallic component that reacts with a reactant gas during the thermal spray process to produce a reaction product having a higher resistivity than the free metallic component. For example, in one preferred embodiment of the invention, the feed stock for the thermally sprayed heater layer comprises a flat metal ribbon that is formed into a wire that surrounds a core of an insulating material. The insulating material can be a powder, such as a powdered ceramic. In one embodiment, a flat metal ribbon is formed into a wire over an insulating powder of aluminum oxide. This "cored" wire is then thermally sprayed, preferably using a twin arc wire system, in the presence of a reaction gas, to produce a coating on a suitable substrate. The resulting thermally sprayed coating is characterized by substantially increased resistivity relative to aluminum alone, as a result of both the ceramic aluminum oxide powder in the feed material, as well as the electrically insulative reaction product (e.g., aluminum oxide) formed by the reaction of the molten aluminum metal and the reaction gas (e.g., oxygen). Thus, a cored wire feed stock of aluminum metal and aluminum oxide ceramic provides the benefit of the extraordinary sticking power of aluminum and the high-resistivity of a large volume fraction of aluminum oxide where normally aluminum, even with an oxidized component, typically has a low resitivity.

Figure 2A:
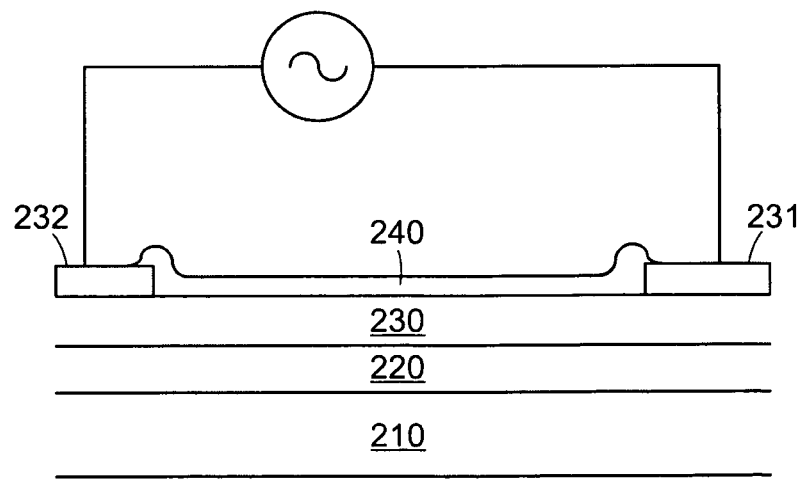
FIG. 2A is a cross-sectional view of a layered heater element in accordance with one aspect of the invention.

Turning now to FIG. 2A, an exemplary embodiment of an electric resistance heater 200 of the present invention is illustrated. The heater 200 includes a substrate 210, which can be an engineering material, such as a steel plate, that can comprise, for example, a wall of a housing or duct in which a gas can flow. The surface of the substrate 210 can be roughened, by grit blasting for example, to promote better adhesion of the coating layer(s). When the substrate is a metal or other electrical conductor, it is necessary to deposit an electrically insulating layer 220, such as a polymer or ceramic, over the substrate 210 to insulate the substrate 220 from the resistance heater layer. The insulating layer 220 can comprise any suitable insulating material (e.g., aluminum oxide, zirconium oxide, magnesium oxide, etc.), and can be applied by any suitable method. The insulating layer 220 can be deposited by a thermal spray process, such as the processes described above. Next, a resistive heater coating layer 230 is applied by a thermal spray process, as described above. Electrical contact pads 231, 233 are provided in contact with the heater layer 230 in order to connect a voltage across the heater layer 230 and generate heat resistively. The heater layer 230 can be connected to a power source by any suitable method, such as brazing connectors, soldering wires, or by physical contact using various mechanical connectors.

It is frequently necessary to cover the heater layer 230 to protect users from electric shock and/or protect the heater from environmental effects such as moisture. This can be done by overcoating the heater layer 230 with another insulating layer 240 of a ceramic or polymer, such as aluminum oxide, or by encapsulation of the heater in an enclosure.

It will be understood that numerous variations of the above-described heater 200 can be made consistent with the particular application. For instance, additional layers and coatings can be provided for various purposes, including, without limitation, an adhesion or bond layer on the substrate, layers for improved thermal matching between layers with different coefficients of thermal expansion, and one or more layers to promote or inhibit heat transfer, such as a thermally emissive layer, a thermally reflective layer, a thermally conductive layer, and a thermally insulative layer. It will also be understood that a resistive heater layer 230 may be deposited directly onto a non-conductive substrate without an electrically insulating layer 220.

Figure 2B:
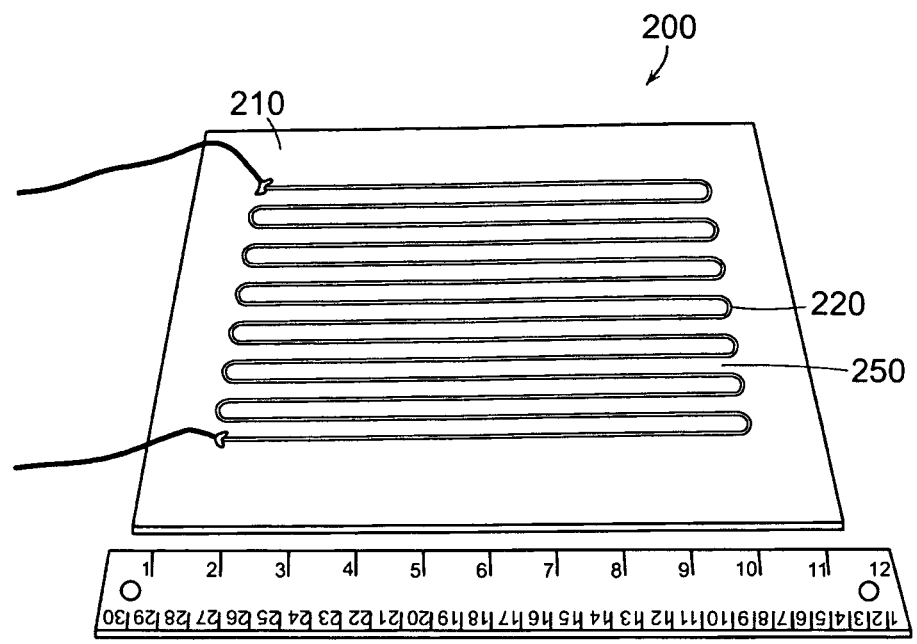
FIG. 2B is a plan view of the heater element of FIG. 2A.

A heater 200 such as described above in connection with FIG. 2A can have any desired shape. In a preferred embodiment of a heating element for a gas heater, the heater 200 comprises a panel heater that can form, or be housed within or mounted adjacent to, a wall of a duct or housing in which a gas can flow. An example of a flat panel heater 200 is illustrated in FIG. 2B. Such a design is advantageous and can dramatically improve heater performance in several key aspects since the heater 220 distributes its heat uniformly over a surface rather than concentrating it along a wire. As can be seen in FIG. 2B, the resistive heater layer 220 comprises a defined circuit pattern on the substrate 210, separated by insulated regions 250. The circuit pattern can be defined during the thermal spray process using a removable patterned mask. The circuit pattern could also be formed after the heater layer 220 is coated on the substrate, such as by scribing the pattern with a laser or a cutter.

Thermal spray methods can be adapted for the deposition of many materials that melt congruently, i.e., any material that doesn't decompose or sublimate. Furthermore, thermal spray is capable of depositing coatings on many different substrates provided they are suitably prepared before deposition. Preparation usually involves roughening the substrate because the coating bond strength is proportional to the degree of roughness of the substrate as the principle mechanism of bonding in thermal spray is a mechanical interlock of coating and substrate. Substrates can be metals, ceramics, polymers, or glasses. In certain embodiments, a mica material is used as a substrate. The mica can be fabricated with a porous surface without roughening to improve thermal coating adhesion. Additionally, materials having a higher thermal expansion coefficient and/or a higher thermal conductivity can be added to the mica material during substrate fabrication to improve the thermal matching of the heater element and the underlying substrate.

Mica is a naturally occurring mineral found in two forms, muscovite and phlogopite. For industrial use, the raw material is pulverized and blended with a binder, then subjected to simultaneous pressure and temperature to form a dense, stable material. The surface of the finished product is typically smooth and free from porosity. The microstructure is typically crystallites with plate-like morphology that have poor intercrystalline bonds.

Mica is a desirable substrate for heater coatings for certain applications. The material has very high dielectric strength, so a dielectric layer need not be deposited first before the heater layer as in the case of metal substrates. It is inexpensive, which makes it suitable for low cost, high volume applications such as gas heaters, cooking appliances (e.g., ovens, toasters, cooktops), and other appliances (e.g., clothes dryers). It can be formed into sheets that are easily cut but have acceptable mechanical strength; and it is refractory enough to withstand maximum temperatures as high as 1200° C.

One deficiency with mica as a substrate for heater coatings is low thermal expansion. The bulk thermal expansion of mica is typically lower than most metallic based heater coatings. Therefore, when the structure heats up, a stress state builds at the substrate-coating interface due to thermoelastic stresses. These stresses can cause bending of the substrate or even delamination of the coating.

A second problem with mica is that it is difficult to prepare using conventional methods for thermal spray coatings. That is, mica is difficult to roughen using mechanical means such as grit blasting or through the use of an abrading tool. That is because of its crystalline microstructure which does not undergo plastic deformation like a metal nor does it manifest simple grain pull-out like many ceramics. Rather, the mica tends to flake and disintegrate when roughened as well as develop micro fractures below the remaining surface.

A third problem with mica is that it has extremely low thermal conductivity. Thus, when a high temperature heater coating is deposited on it, the thermal energy generated in the heater does not flow easily to uncoated areas as in a metal. Rather, large temperature gradients are set up that induce commensurately large thermal expansion gradients. These gradients create stresses which can exceed the fracture strength of the mica and cause cracking.

To address the problems associated with mica, certain embodiments of the present invention utilize the insertion of an electrical insulator, such as aluminum nitride into a mica powder during fabrication. The insulator can be selected to have a higher thermal conductivity than pure mica to thereby increase the resulting bulk thermal conductivity of the substrate. In another preferred embodiment, a high temperature electrical insulator such as zirconium oxide, aluminum oxide and/or magnesium oxide or a silicate possessing a higher thermal expansion coefficient relative to pure mica can be used to improve the thermal matching properties of the layered heater structure. A plurality of mica layers formal using this process can be used to form a laminate substrate and heater composite.

Additionally, the mica surface can be fabricated with a more porous surface to increase mechanical adhesion of the thermally sprayed coating to the mica surface. In particular, the mica, or other substrate material, can be made with a powder in which the particle size and binder volume are adjusted to roughen the surface by increasing the number and/or size of pores at the surface such that mechanical roughening is not necessary.

Finally, it is difficult to apply a coating to a heater deposited on mica that needs to operate at high temperatures. Such overcoats are often necessary to ensure electrical safety or to protect the heater from environmental attack. At low temperatures, there are various polymeric and silicone materials that can be over laid, however above about 300° C., silicates or other ceramic materials can be used.

Figure 3A:
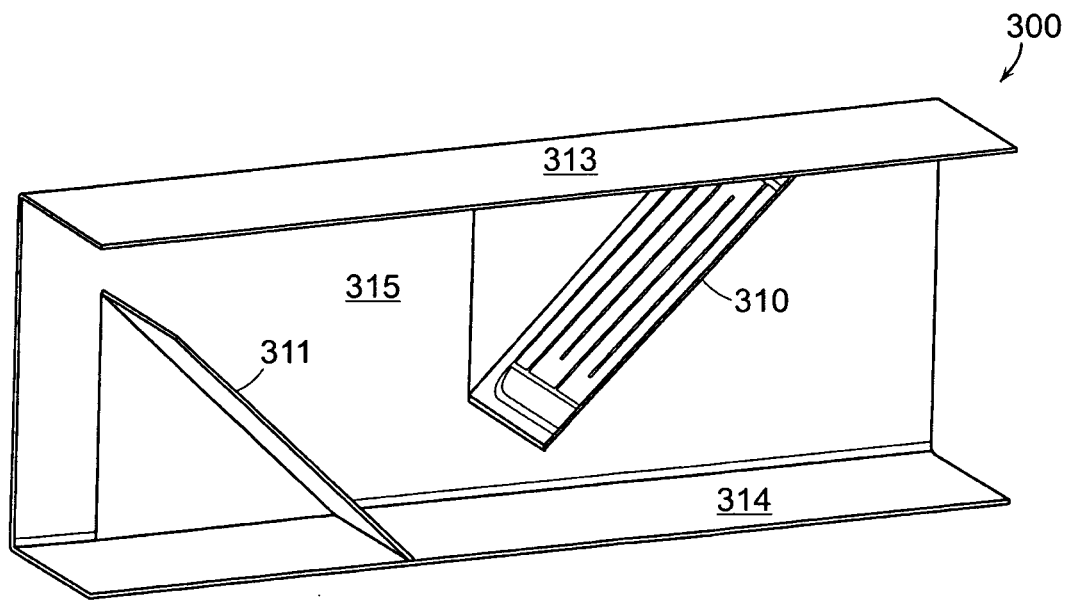
FIGS. 3A and 3B illustrate a cutaway view of a duct gas heater with heating panels in accordance with one embodiment of the invention.
Figure 3B:
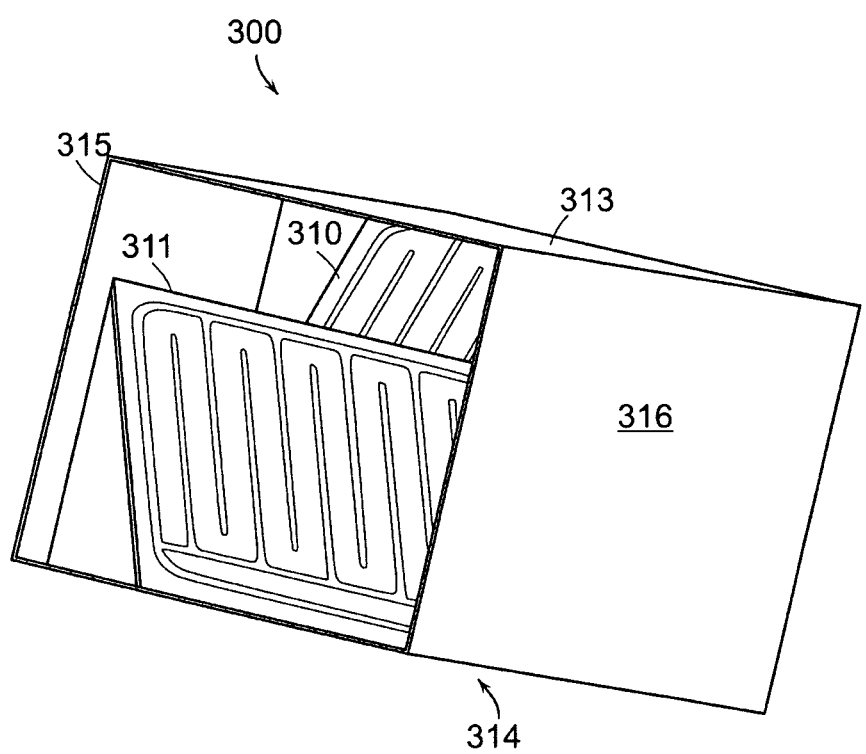

Turning now to FIGS. 3A and 3B, a duct gas heater 300 with heating panels 310, 311 is shown in accordance with one embodiment of the invention. The panels 310 and 311 can comprise heater panels having a thermally-sprayed resistive heater layer formed on a suitable substrate, such as described above in connection with FIGS. 2A and 2B. The duct gas heater 300 includes walls 313, 314, 315, 316 defining an enclosure through which a gas can flow. The gas can be forced through the enclosure by a blower or fan in fluid communication with the duct gas heater 300. In this embodiment, two heater panels 310 and 311 are shown inserted in the gas stream. However, it will be understood that any number of panels can be employed. Also, although the duct heater 300 shown here includes a rectangular cross-section, other configurations are possible. For example, a circular gas duct can include internal heater panels.

In the duct gas heater 300 of FIGS. 3A and 3B, the panels 310 and 311 are connected to a power source such that when the panels are energized, the resistive heater layer generates heat. The panels 310 and 311 are preferably provided at an angle with respect to the direction of gas flow to help improve the transfer of heat to the flowing gas stream. The angled panels 310 and 311 promote turbulent flow of the gas stream at the interface of the gas stream and the heater panels. This turbulent flow improves thermal coupling between the heater panel and the gas stream. The heat transfer can be predominantly convective heat transfer, over a relatively large contact area. Furthermore, the gas flow over the panels 310, 311 helps cool the panels, so that the panels lose less heat through radiation.

It will be understood that various other configurations are possible in a duct gas heater 300 of the invention. For example, heater panels can be provided on the walls 313, 314, 315, 316, or can even form one or more walls of the enclosure. Furthermore, various structures can be provided to promote turbulent flow of the gas stream, such as vanes inside the duct to direct the gas at an angle with respect to heating surfaces. Other mechanisms for promoting turbulent flow and increasing heat transfer include, for example, increasing the surface roughness of the heat transfer surfaces, as well as adding corrugations or other asperities to the heat transfer surfaces within the duct.

In certain embodiments, a duct gas heater 300 of the invention can be used to deliver heated gas (e.g., air) to a room or a building. An advantage of this system is that each individual heater panel can be individually controlled to control the heat provided to a particular room or area. Furthermore, because of the large area of heat transfer, the turbulent flow of the heat transfer media (e.g., air), and the predominantly convective heat transfer provided by the present heater, heat can be provided at relatively low power, as compared to, for example, a wire heating element.

Figure 4A:
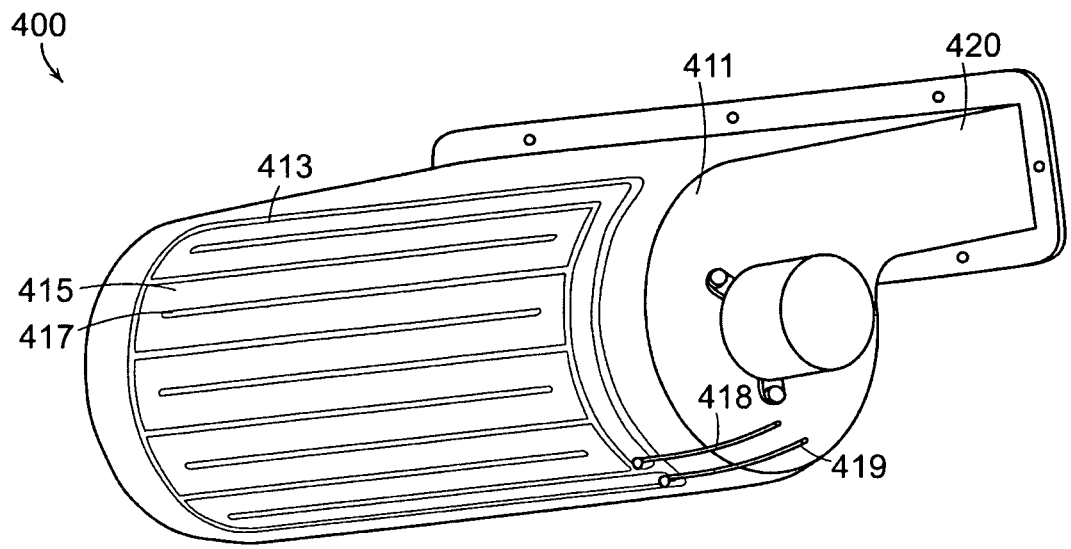
FIGS. 4A and 4B are perspective views of a gas heating system having a heater coating formed on a blower fan housing.
Figure 4B:
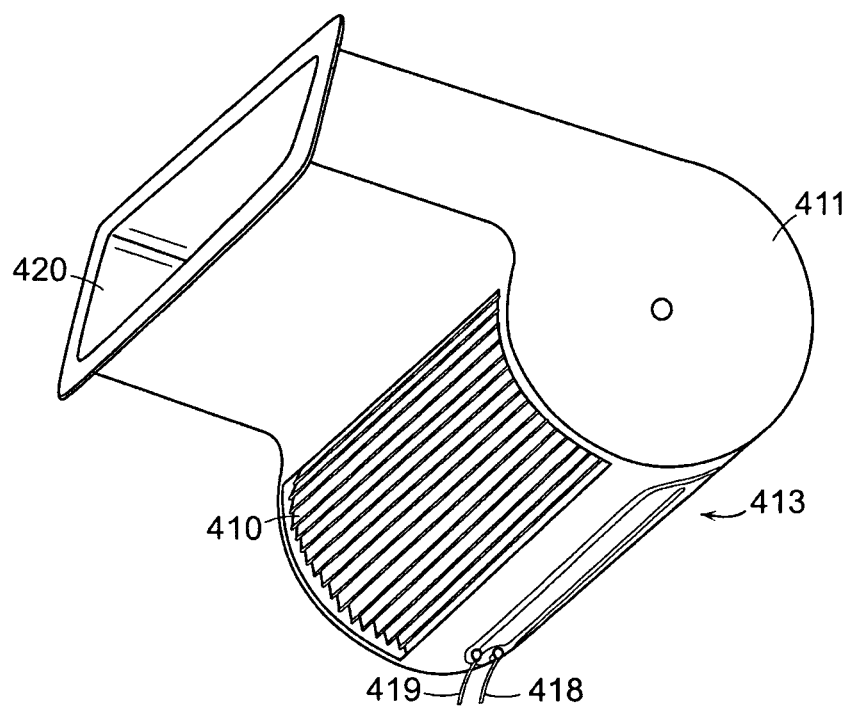

FIGS. 4A and 4B show a hot gas blower 400 having a fan 410 with a heater coating 413 formed on the housing 411 that encloses the fan. The heater coating 413 comprises a resistive heater layer that is preferably formed by a thermal spray process. The heater coating 413 can be thermally sprayed directly onto the housing 411. An advantage of employing a thermal-spray process is that the heater coating can easily conform to the shape and contour of the housing 411, which in this embodiment is a curved housing that partially surrounds the outer circumference of the fan blades. Where the housing 411 is made from an electrically conductive material, the heater layer can be deposited on an intermediate insulating layer to prevent electrical shorts. The intermediate layer can comprise an insulating material that can also be deposited by thermal spray. The heater coating 413 can be patterned into a circuit 415 separated by insulating regions 417. Electrical connectors 418, 419 are connected to the circuit 415 to energize the heater coating 413 and generate heat. One or more additional layers can optionally be provided over the heater coating 413 to provide, for example, thermal insulation, environmental protection and/or safety.

In operation, a gas, such as air, is drawn radially into the blower housing 411 by the operation of fan 410, and the moving fan blades force the gas at relatively high velocity into contact with the interior wall of the housing 411. The wall of the housing 411 is directly heated by heater coating 413, and transfers heat energy to the gas stream. The design of the blower and the forces generated by the operation of the fan promote a highly turbulent gas flow, which facilitates heat transfer to the gas stream. The blower 400 advantageously provides a large surface area of thermal contact between the heating surface and the gas, and the gas predominantly flows at an angle with respect to the (curved) housing 411, thus increasing turbulence and promoting efficient convective heat transfer to the gas. As the gas moves circumferentially around the interior of blower housing 411 (in a counterclockwise direction in FIG. 4B), the gas continues to absorb heat energy, and the heated gas is eventually forced out through outlet duct 420. The heated gas can then be employed for any suitable purpose, such as, for example, heating a room, cooking food, or drying clothes.

The circuit pattern 415 of the heater coating layer 413 can be formed to provide uniform heat, or in some embodiments, non-uniform heat to the gas. For example, the geometry of the resistive circuit 415 can be configured to provide more power, and therefore more heat transfer, at the cooler gas inlet side of the blower 400, and less power and heat towards the outlet duct 420.

Figure 5A:
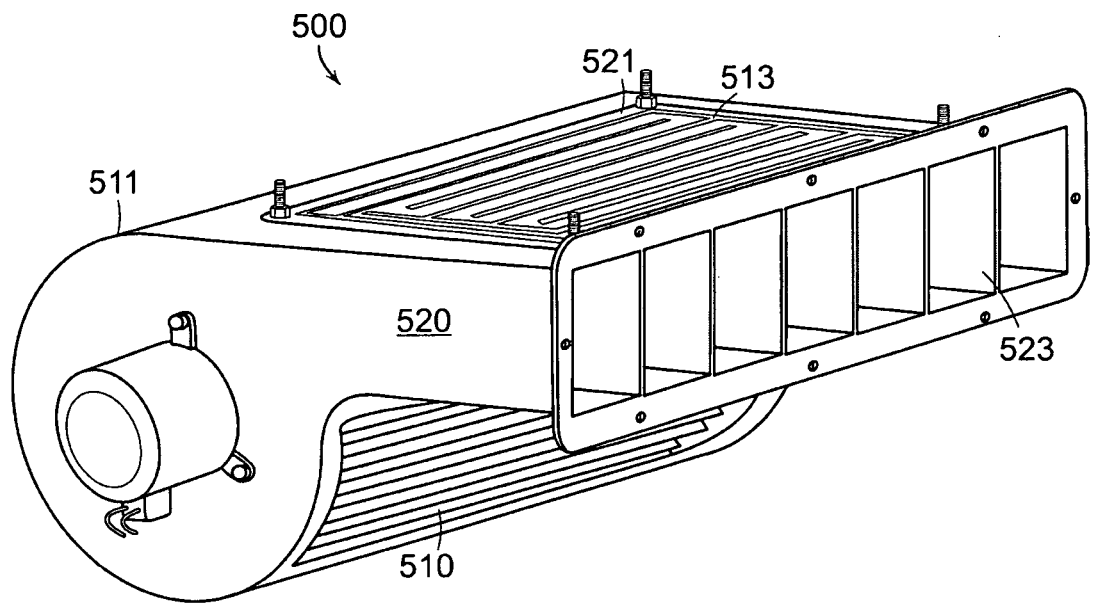
FIGS. 5A and 5B are perspective views of gas heating systems having a heater coating attached to the outlet of a blower.

A further embodiment of a hot gas blower 500 is illustrated in FIG. 5A. This embodiment is similar to the embodiment of FIGS. 4A and 4B, and includes a fan 510 at least partially enclosed in a housing 511. Gas is drawn into the blower 500 at the bottom of the housing 511, and exits via outlet duct 520. In this embodiment, a heater coating 513 is provided on a surface of the outlet duct 520, downstream of the fan 510. The heater coating 513 preferably comprises a resistive heating layer formed by thermal spray, and can be sprayed directly onto the surface of the duct 520. Alternatively, the coating can be thermally sprayed onto a separate substrate to provide a heater panel 521, such as described in connection with FIGS. 2A and 2B, that is attached to the duct 520. The heater panel 521 can comprise a non-conductive substrate, such as mica, or a metallic material. A thermally conductive gasket can be provided between the heater panel 521 and the duct 520.

The blower embodiment of FIG. 5A will generally provide less turbulent gas flow compared to the embodiment of FIGS. 4A and 4B, since the heater coating is provided on the outlet duct and is oriented generally parallel to the direction of gas flow. One method to improve heat transfer in the blower 500 is to provide vanes 523 inside the outlet duct 520. The vanes 523 can increase the surface area available for heat transfer, and depending on their configuration, can increase the degree of turbulent flow within the blower.

FIG. 5A illustrates vanes 523 extending vertically within duct 520. An alternative configuration shown in FIG. 5B includes vanes 523 extending in both horizontal and vertical directions. The vanes 523 are preferably made from a material that is a good thermal conductor, so that heat from heater panel 521 is conducted along the vanes 523 into the interior of the duct where it can be imparted to the passing flow of gas.

Figure 5B:
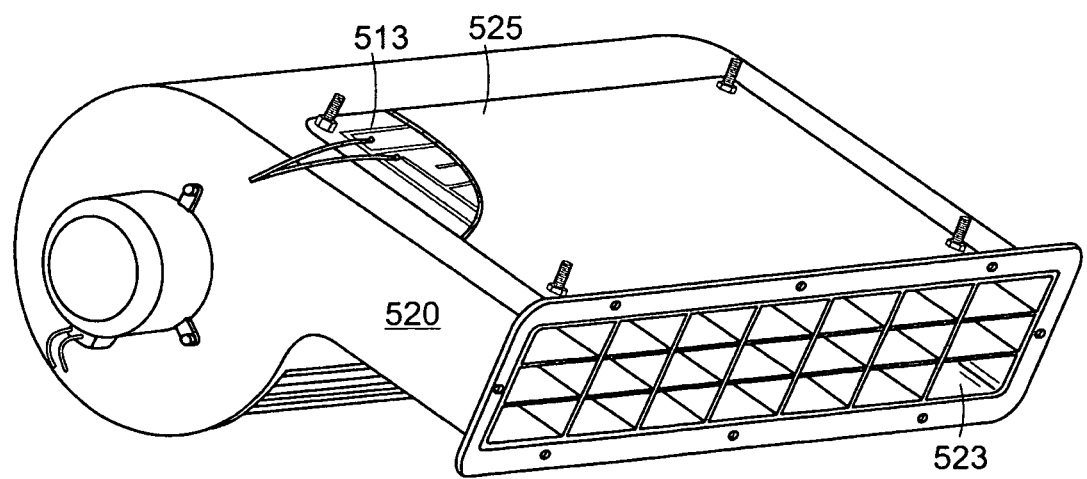

The heater panel 521 can include one or more protective overcoat layers 525 over the heater coating 513, as shown in FIG. 5B. The overcoat can provide thermal insulation, protection from the environment and/or safety.

It will be understood that heater coatings can be provided on any surface of the gas blower 500. For example, a blower can include a heater coating on the fan housing as shown in FIGS. 4A and 4B, as well as on the outlet duct as shown in FIGS. 5A and 5B. Furthermore, although FIGS. 5A and 5B show a heater coating on the top surface of the outlet duct, heater coatings could be provided on any internal or external surface of the duct, and can be provided on multiple surfaces of the duct. Coatings could also be provided on vanes, or on components of the fan, such as the fan blades. Surface roughening, corrugations or asperities can be provided to any surface of the blower in order to promote turbulent gas flow.

Figure 6A:
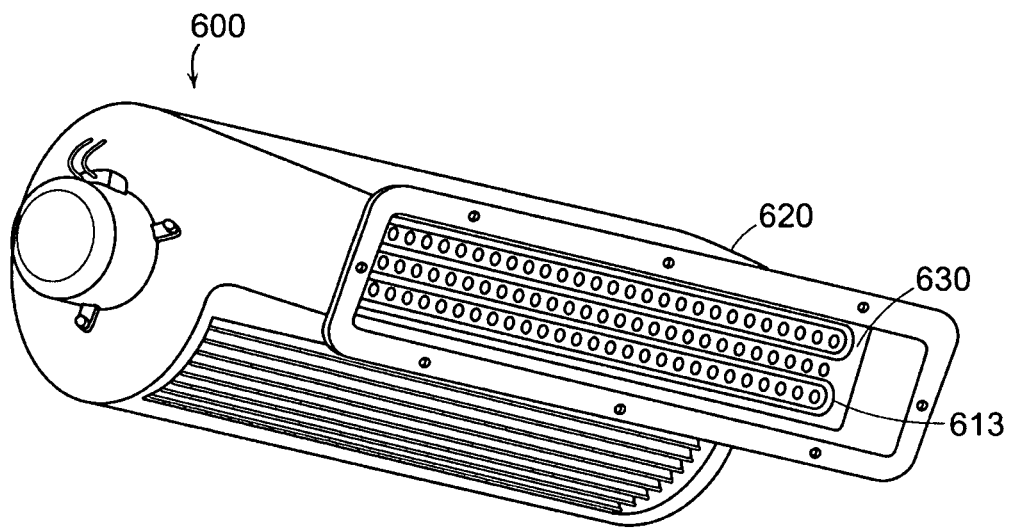
FIGS. 6A and 6B are perspective views of a gas heating system having a blower and a heater coating formed on a perforated substrate positioned in the outlet stream of the blower.
Figure 6B:
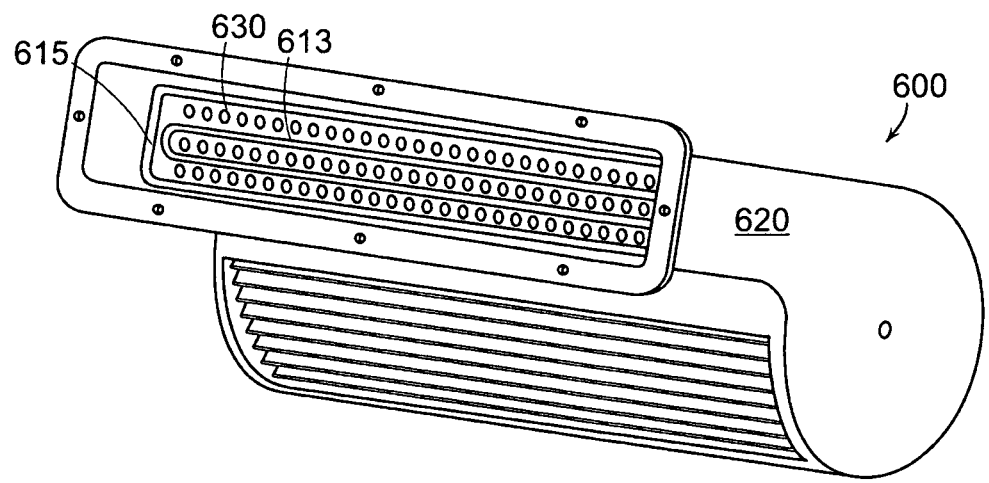

Yet another embodiment of a hot gas blower 600 is shown in FIGS. 6A and 6B. This embodiment is similar to the blowers of FIGS. 4A, 4B, 5A and 5B, but includes a perforated substrate 630 positioned in the outlet air stream. The perforated substrate 630 includes a heater coating 613 provided on the substrate. The heater coating preferably comprises a resistive heating layer formed by thermal spray. The resistive heating layer can be thermally sprayed directly onto the surface of the substrate 630 (which can be perforated either prior to or after the heating layer is deposited). Where the substrate 630 comprises an electrically conductive material, an intermediate insulating layer can be provided between the heating layer and the substrate. In the embodiment of FIGS. 6A and 6B, the resistive heating layer forms a contiguous circuit trace 615 that winds across the surface of the substrate 630.

The perforated substrate 630 preferably comprises a thermally conductive material, and can comprise a metal. In certain embodiments, the heater coating 613 can be deposited on a substrate 630 that comprises a screen material, such as porcelainized steel.

The perforated substrate 630 is provided in the interior of the outlet duct 620, and can be oriented generally perpendicular to direction of gas flow. This configuration promotes turbulent gas flow and more efficient heat transfer. The perforated substrate 630 could also be provided at an angle with respect to the direction of gas flow. In certain embodiments, the blower 600 can include multiple substrates 630, each having a heater coating 613, provided in series within the outlet duct 620. The perforations in each substrate 630 can be offset from the perforations in adjacent substrate(s) to promote increased turbulence. Surface roughening, corrugations or asperities can be provided to any surface of the blower along the gas flow path to promote additional turbulent flow.

Figure 7A:
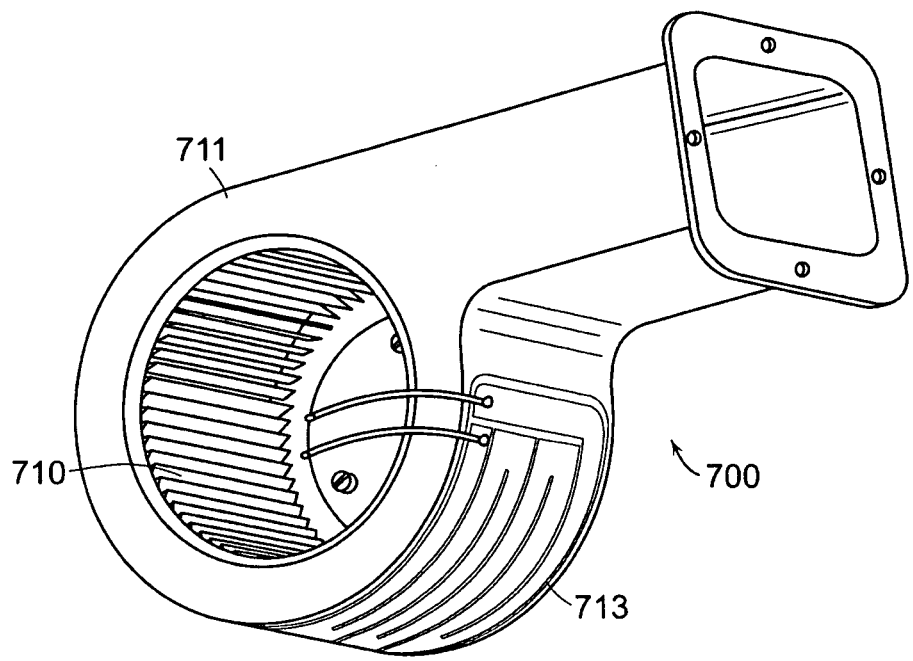
FIGS. 7A and 7B are perspective views of a gas heating system having an axial inlet blower and a heater coating formed on the blower fan housing.
Figure 7B:
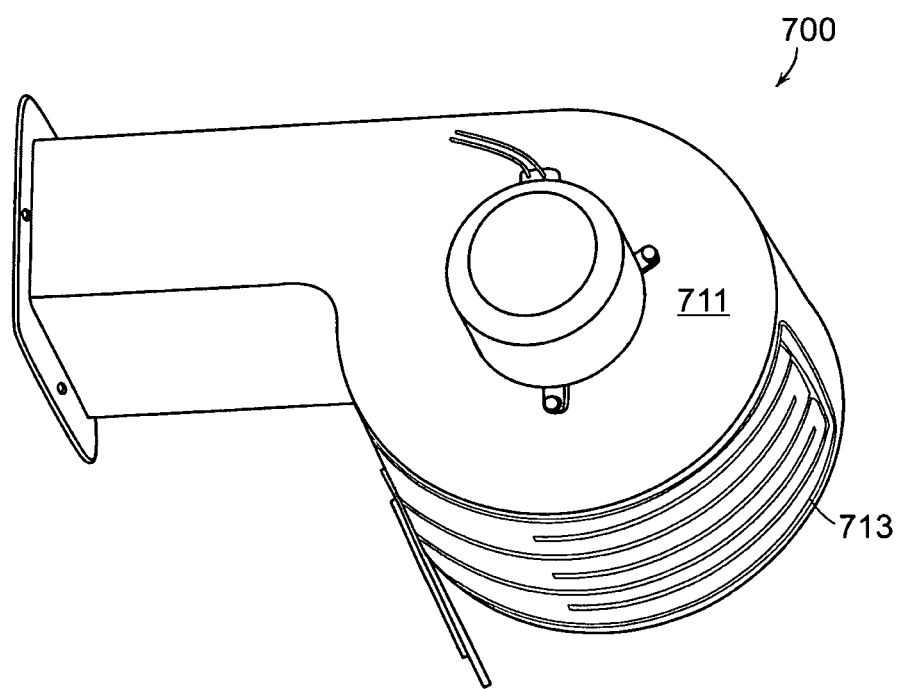

FIGS. 7A and 7B illustrate a further embodiment of a hot gas blower 700 according to the invention. This embodiment is similar to the embodiment shown in FIGS. 4A and 4B. However, in the embodiment of FIGS. 7A and 7B, the blower 700 is of the type in which gas enters the blower housing 711 axially, and is then drawn into the fan 710 radially. In this embodiment, the heater coating 713 can be provided over substantially the entire circumference of the blower housing 711, resulting in a large surface area for heat transfer. Moreover, this embodiment provides a generally turbulent gas flow to promote efficient convective heat transfer.

Figure 8A:
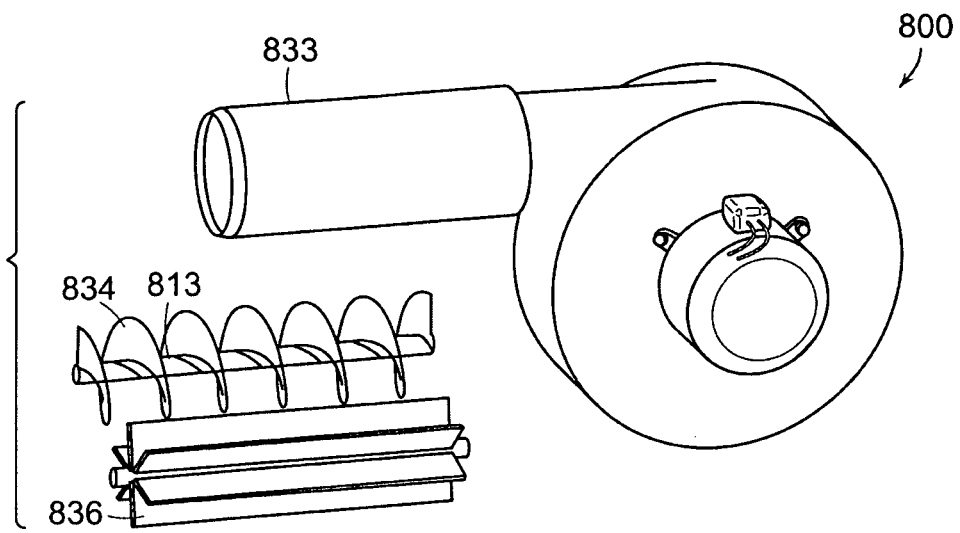
FIGS. 8A and 8B are perspective views of a gas heating system having a blower and a tubular hot gas outlet having vane elements with heater coatings formed on the vane elements.
Figure 8B:
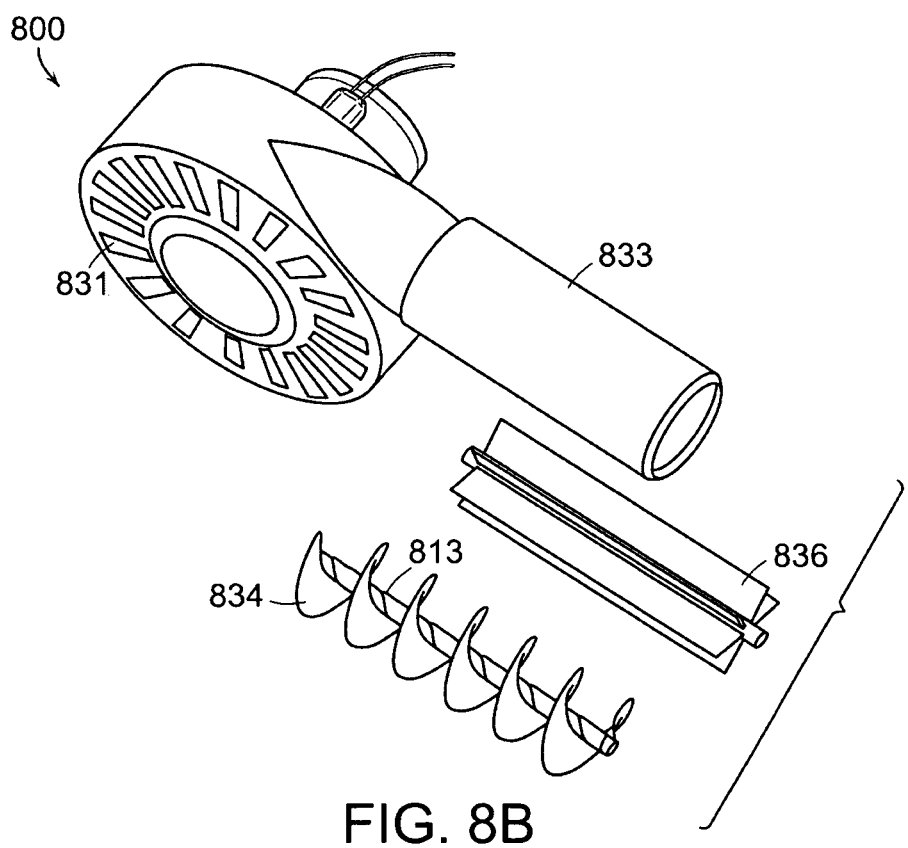

Yet another alternative is illustrated in FIGS. 8A and 8B. In this embodiment, a hot air blower 800 includes an axial gas inlet 831, and a tubular gas outlet duct 833. The outlet duct 833 includes a vane 834 having a heater coating 813 provided on the vane 834. As in the previous embodiments, the heater coating 813 comprises a resistive heater layer that is preferably deposited by thermal spray. In FIGS. 8A and 8B, the vane 834 is shown outside the outlet duct 833 to better illustrate the vane, though in operation the vane is provided inside duct 833 and the heater coating 813 is connected to a power source to provide resistive heating. Vane 834 includes a helical configuration, and the resistive heating layer can be thermally sprayed directly onto the surface of the helical vane (using, for example, a lathe or similar apparatus to turn the vane while the coating is thermally sprayed onto the vane). The helical vane 834 promotes a highly turbulent gas flow for efficient heat transfer. In an alternative configuration, the vane 836 can include straight surfaces extending along the axis of the tubular duct, with heater coatings provided on one or more surfaces of the vane 836.

Figure 9:
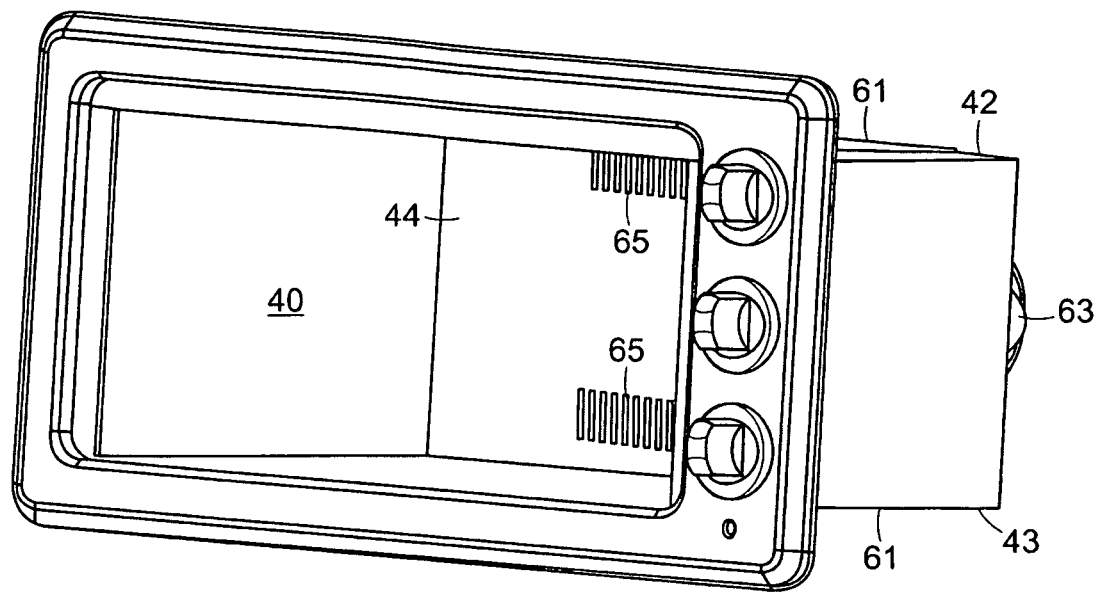
FIG. 9 is a perspective view of an oven having heater panels and a blower for convection heating.

FIG. 9 illustrates a convection oven 60 having heater coating elements in accordance with the invention. Convection ovens using heater coatings can demonstrate very fast heat-up rates because of efficient heat transfer to air. In the convection oven of FIG. 9, the oven includes one or more heater panels 61 located on or adjacent to the oven wall(s), and in thermal communication with the oven cavity 40. The heater panels 61 can be identical to the panels described above in connection with FIGS. 2A and 2B, and can provide a component of radiant heat to an object within the oven cavity 40. In this embodiment, heater panels 61 are mounted on the exterior surface of both the top 42 and bottom 43 walls of the oven. It will be understood that heater panels 61 can be located on additional surfaces, on both the outside and inside walls of the oven cavity. In addition, the convection oven 60 includes an air circulation system to provide a conductive heating component. In this embodiment the air circulation system comprises a blower 63 that is mounted behind the rear wall 44 of the oven. The blower 63 produces an air stream that is directed into the oven cavity 40 via vent apertures 65 in the rear wall 44 of the oven. Air that is forced by the blower 63 passes over the surfaces heated by heater panels 61 and therefore picks up heat for transfer to an object (such as a food substance) located in the oven cavity 40. Heat transfer to the circulating air is enhanced due to the large area of the heater panels 61. This is in contrast to a conventional convection oven that typically has only a small fraction of air passing over a conventional heating element (such as a Cal-rod heating element).

If heater coatings are inserted into the oven cavity on separate panels, such as the suspended panel 51 illustrated in FIG. 9, air that is forced over the panel 51 will receive a larger amount of heat more quickly than a conventional Cal-rod style oven because of the larger surface area over which the heater 51 is disposed.

Other advantages of the present convection oven include enlargement of the usable space in the oven cavity because of the absence of conventional heating elements, less assembly time, rapid heat-up and high efficiency.

Panels 61 containing heater coatings can be placed anywhere in the air stream, preferably where a large proportion of the flowing air flows over either the panels themselves, or else over surfaces heated by the panels, for efficient heat transfer to the circulating air. The panels 61 or heating surface(s) can be modified with features such as ripples or asperities to induce turbulence at the surface for improved heat transfer. Vanes or apertures can also be provided to purposely direct the airflow over heated surfaces in the oven cavity. In addition, heat transfer can be enhanced by arranging air flow so that the air stream is not parallel to the heat transfer surface, but is perpendicular or at an angle relative to the heated surface. This induces turbulence, hence improved heat transfer, when the air is forced to change direction at the heated surface.

Figure 10:
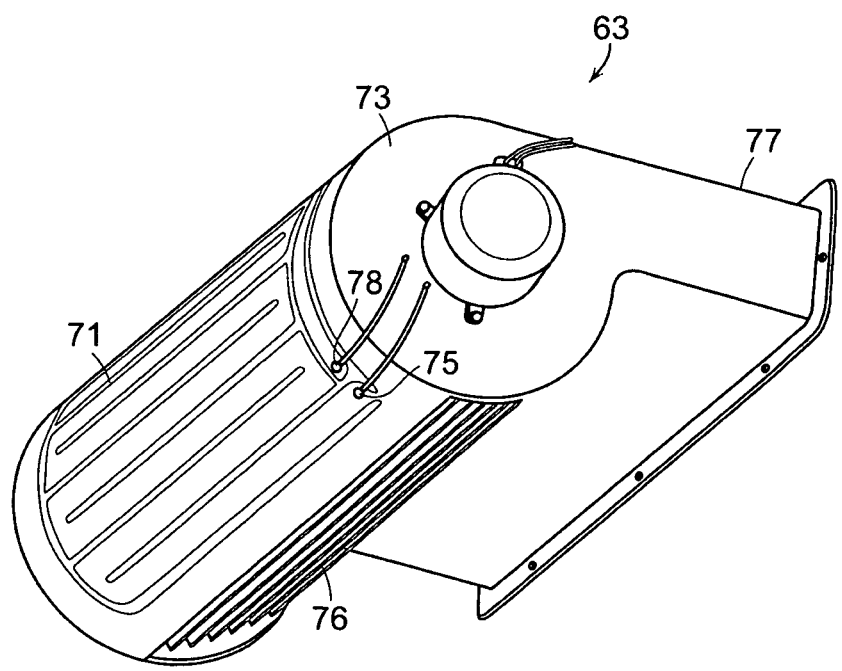
FIG. 10 is a perspective view of a blower for a convection oven having a heater coating in accordance with one aspect of the invention.

As shown in FIG. 10, heater coatings 71 can be incorporated into the blower 63 itself to improve heat transfer to the circulating convection air. In this embodiment, essentially all the air that is forced by the blower passes over the heater coating 71 and therefore picks up heat for transfer to the oven cavity 40. The heater coatings 71 comprise a resistive heating layer that can be thermally-sprayed onto the blower housing 73, and patterned to provide a resistive heating circuit when a voltage is provided across electrodes 74, 75. The heater coatings 71 can be applied to any surface on or within the blower 63. A motorized fan 76 forces air to flow proximate the heater coating 71, where the air is heated, and then into the oven via an air duct 71.

Figure 11:
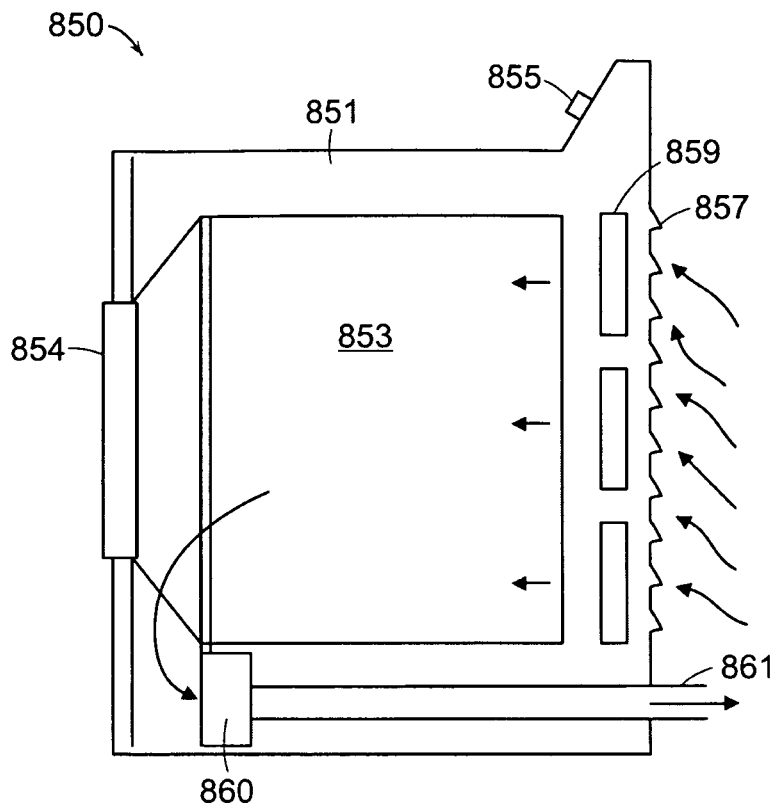
FIG. 11 is a schematic illustration of a clothes dryer having a heater coating for providing a hot gas stream.

FIG. 11 is a schematic illustration of a clothes dryer 850 having a thermally sprayed heater for providing a hot gas stream. The dryer 850 includes a housing 851. Inside the housing 851 is a rotatable drum 853 that tumbles clothing while hot air passes through the drum 853. A door 854 is located on the front of the housing 851 for accessing the interior of the drum 853. Controls 855 control the operation of the dryer 850. When the dryer 850 is operating, a fan 860 or other motive apparatus is operated to draw ambient gas into the dryer housing 851. In this embodiment, the gas enters the housing 851 through vent holes 857 in the rear of the dryer. The gas is then forced to pass over heating elements 859, which in this embodiment comprise one or more thermally sprayed heaters. The thermally sprayed heaters 859 transfer heat to the gas, preferably primarily by convection with minimal radiant heat loss. The heated gas can then enter the drum 853 through openings in the rear wall of the drum. The hot gas flows over the tumbling clothes in the drum, picking up moisture, before exiting the drum 853 and housing 851 through vent 861.

Figure 12:
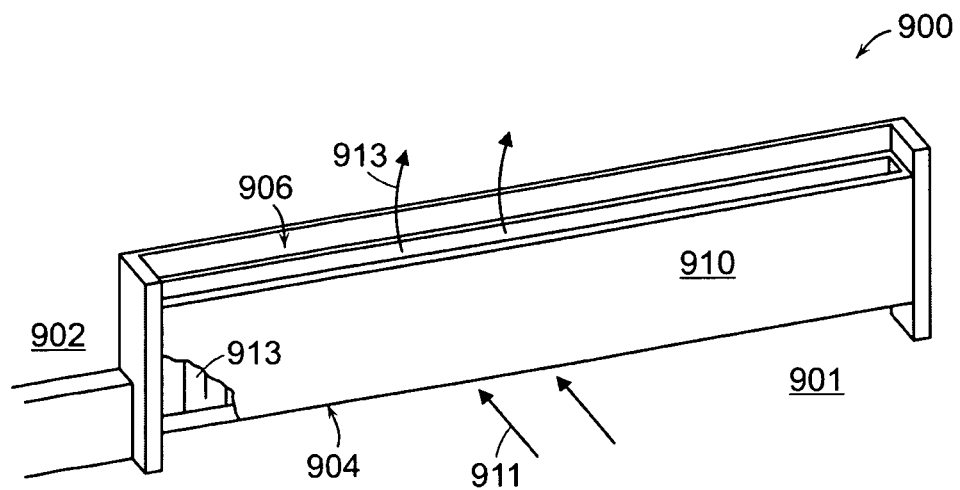
FIG. 12 is a schematic illustration of a baseboard room heating system having a heater coating.

FIG. 12 is a schematic illustration of a baseboard room heating system 900 according to yet another aspect of the invention. A baseboard room heater 900 is generally installed on or near the floor 901 of a room, and typically against a wall 902 in an unobstructed place. This type of heating system relies on the natural convention of heated air to distribute heat. The heating system 900 of FIG. 12 includes a housing 910 having a lower opening 904 for admitting a gas flow 911 and an upper opening 906 through which heated gas 913 exits into the room. The housing 910 is partially cut away to illustrate a thermally sprayed heater 913, which can be provided in the housing in any suitable configuration. The gas 911 is drawn into the opening 904 by natural convection forces, where the heater 913 transfers heat to the gas. The warmed gas then exits through the upper opening 906 by natural convection, and spreads through the room, providing heat. The thermally sprayed heaters of the present invention are particularly advantageous for use in a baseboard heater since they are characterized by low radiant heat loss, so that they will not overheat or burn the surrounding structures (such as humans, pets or dust and dirt in the room). Furthermore, because of the high degree of convective heat transfer, they can provide the required heat at low power compared to conventional wire-type heating elements, and are thus cheaper and more efficient.

Examples of resistive heater coating layers and methods for the fabrication of heating elements, and various applications for heater coating layers, are described in commonly-owned U.S. Pat. Nos. 6,762,396, 6,919,543, and 6,294,468, and in commonly-owned U.S. Published Patent Applications Nos. 2005/0252906 A1 and 2006/0288998 A1. The entire teachings of the above-referenced patents and published patent applications are incorporated herein by reference.

Although various embodiments of gas heaters are described in connection with resistive heating layers formed by thermal spray, it will be understood that gas heaters of the type described herein can include various types of electrical resistive heaters, including, for example, resistive heaters deposited as coatings using sputtering, sol-gel, ion implantation, evaporation, chemical vapor deposition and various thick film technologies such as screen printing and dispensing. Other resistive heaters that cover a surface, such as thin foils and flexible heaters, are also applicable to the gas heaters described herein.

While the invention has been described in connection with specific methods and apparatus, those skilled in the art will recognize other equivalents to the specific embodiments herein. It is to be understood that the description is by way of example and not as a limitation to the scope of the invention and these equivalents are intended to be encompassed by the claims set forth below.

What is claimed is:

1. A drying appliance, comprising:
a housing;
a cavity within the housing;
a gas flow device for providing a flow of gas to the cavity to dry a material within the cavity;
a thermally-sprayed heater for heating the flow of gas to be provided to the cavity, the thermally-sprayed heater including a resistive heating layer having substantially lamellar structure comprised of substantially flattened circular platelets of an electrically conductive material and an electrically insulating material, the electrically conductive material including a metallic component, the electrically insulating material including a reaction product of the metallic component the reaction product being at least one of an oxide nitride carbide and boride of the metallic component, the thermally-sprayed heater generating heat when electricity is passed through the substantially lamellar structure.

2. The drying appliance of claim 1, further comprising a gas flow duct within which the thermally-sprayed heater is positioned.

3. The drying appliance of claim 2, wherein the gas flow duct has a gas flow channel, the channel having a surface shaped such that the flow of gas contacting the resistive heating layer is turbulent.

4. The drying appliance of claim 3, wherein the thermally-sprayed heater is structured, sized, and arranged within the gas flow duct such that heater transfer from the heating layer to the gas is predominately by forced convection.

5. The drying appliance of claim 4, wherein the resistive heating layer comprises a first material and a second material, the first material being an electrically conductive material and the second material being an electrically insulating material.

6. The drying appliance of claim 5, wherein the electrically conductive material comprises a metallic material.

7. The drying appliance of claim 6, wherein the electrically insulting material comprises a reaction product of the metallic material.

8. The drying appliance of claim 1, wherein the resistive heating layer comprises a first material and a second material, the first material being an electrically conductive material and the second material being an electrically insulating material.

9. The drying appliance of claim 8, wherein the electrically conductive material comprises a metallic material.

10. The drying appliance of claim 9, wherein the electrically insulting material comprises a reaction product of the metallic material.

11. The drying appliance of claim 1, wherein the flow of gas is a turbulent flow of gas.

12. The drying appliance of claim 11, wherein heat transfer from the heater layer to the gas is predominately by forced convection.

13. The drying appliance of claim 1, further comprising a support substrate upon which the resistive heating layer is disposed.

14. The drying appliance of claim 13, wherein the support substrate comprises a mica material.

15. The drying appliance of claim 13, further comprising a protective layer disposed over the heating layer and the support substrate.

16. The drying appliance of claim 1, wherein heat transfer from the heater layer to the gas is predominately by forced convection.

17. The drying appliance of 1, wherein the drying appliance is a clothes dryer.

18. A drying appliance, comprising:
a first housing;
a cavity within the first housing;
a gas flow device for providing a flow of gas to the cavity to dry a material within the cavity;
a thermally-sprayed heater for heating the flow of gas to be provided to the cavity, the thermally-sprayed heater including a resistive heating layer having substantially lamellar structure comprised of substantially flatted circular platelets of an electrically conductive material and an electrically insulating material, the electrically conductive material including a metallic component, the electrically insulating material including a reaction product of the metallic component the reaction product being at least one of an oxide nitride carbide and boride of the metallic component, the thermally-sprayed heater generating heat when electricity is passed through the substantially lamellar structure;
wherein the gas flow device comprises a blower, the blower enclosed within a second housing; and
wherein the thermally-sprayed heater is sprayed on a surface of the second housing.

19. A drying appliance, comprising:
a housing;
a cavity within the housing;
a gas flow device for providing a flow of gas to the cavity to dry a material within the cavity;
a thermally-sprayed heater for heating the flow of gas to be provided to the cavity, the thermally-sprayed heater including a resistive heating layer having substantially lamellar structure comprised of substantially flatted circular platelets of an electrically conductive material and an electrically insulating material, the electrically conductive material including a metallic component, the electrically insulating material including a reaction product of the metallic component the reaction product being at least one of an oxide nitride carbide and boride of the metallic component, the thermally-sprayed heater generating heat when electricity is passed through the substantially lamellar structure;
a gas flow duct, through which the flow of gas is provided to the cavity;
wherein the thermally-sprayed heater is sprayed on a panel adjacent to the gas flow duct.

20. A drying appliance, comprising:
a first housing;
a cavity within the first housing;
a gas flow device for providing a flow of gas to the cavity to dry a material within the cavity;
a thermally-sprayed heater for heating the flow of gas to be provided to the cavity, the thermally-sprayed heater including a resistive heating layer having substantially lamellar structure comprised of substantially flatted circular platelets of an electrically conductive material and an electrically insulating material, the electrically conductive material including a metallic component, the electrically insulating material including a reaction product of the metallic component, the reaction product being at least one of an oxide nitride carbide and boride of the metallic component, the thermally-sprayed heater heat when electricity is passed through the substantially lamellar structure;

wherein the gas flow device comprises a blower and a second housing, the blower enclosed within the second housing; and wherein the thermally-sprayed heater is sprayed on a panel adjacent to the second housing.

* * * * *